United States Patent
Reisacher

(10) Patent No.: US 6,681,920 B2
(45) Date of Patent: Jan. 27, 2004

(54) DEVICE FOR THE AUTOMATED HANDLING AND INTERIM BUFFERING OF MANUFACTURING COMPONENTS

(76) Inventor: Raimund Reisacher, Römerweg 21A, D-67117 Limburgerhof (DE)

(*) Notice: Subject to any disclaimer, the term of this patent is extended or adjusted under 35 U.S.C. 154(b) by 81 days.

(21) Appl. No.: 09/996,242

(22) Filed: Nov. 28, 2001

(65) Prior Publication Data

US 2002/0066642 A1 Jun. 6, 2002

(30) Foreign Application Priority Data

Dec. 1, 2000 (DE) .................................... 200 20 363 U

(51) Int. Cl.[7] .............................................. B65G 17/32
(52) U.S. Cl. .................... 198/687.1; 118/502; 198/700
(58) Field of Search ........................ 198/700, 678.1, 198/687.1, 484.1, 465.4; 118/502

(56) References Cited

U.S. PATENT DOCUMENTS

| | | | | |
|---|---|---|---|---|
| 1,226,253 A | * | 5/1917 | Reese ........................... 453/32 |
| 2,609,083 A | * | 9/1952 | Leach ...................... 198/465.4 |
| 3,184,042 A | * | 5/1965 | Rutkovsky et al. .......... 198/367 |
| 3,454,148 A | * | 7/1969 | Harrison ................... 198/465.4 |
| 4,527,484 A | * | 7/1985 | Veith et al. ................... 104/89 |
| 4,736,687 A | * | 4/1988 | Grube et al. ............. 104/88.04 |
| 4,903,819 A | * | 2/1990 | Heinold et al. ........... 198/465.4 |
| 4,966,672 A | * | 10/1990 | Levit et al. .................. 204/198 |
| 6,513,646 B1 | * | 2/2003 | Olsen ....................... 198/465.4 |

FOREIGN PATENT DOCUMENTS

| | | |
|---|---|---|
| DE | 41 22 352 | 3/1992 |
| DE | G 92 04 317.8 | 3/1992 |
| DE | G 94 05 437.1 | 3/1994 |
| DE | 299 17 110 | 9/1999 |
| DE | 199 22 343 | 11/2000 |

* cited by examiner

Primary Examiner—Christopher P. Ellis
Assistant Examiner—Richard Ridley
(74) Attorney, Agent, or Firm—Collard & Roe, P.C.

(57) ABSTRACT

The device serves for the automated handling and intermediate buffering of manufacturing components, whereby the components are suspended with the hooks 4 on the racks 1 which are conveyed as a series of racks. Provision is made for a crossbeam 9, 9' comprising the two inwardly directed bars or gutters 10, 42, 59, 56, 58, 8 for receiving the load, which oppose each other and are located within the crossbeam. The elements 14, 48, 46, 61 for introducing the torque when the device is handled are arranged on the racks 1. The racks 1 comprise back-up surfaces located on the front and rear sides. Furthermore, the racks 1 comprise the hooks 4, clamps, fastening points or fastening rails, which are located on the underside or on secondary surfaces and are directed downwards. Provision is made for support surfaces for supporting shelf boxes or conveyor systems.

22 Claims, 11 Drawing Sheets

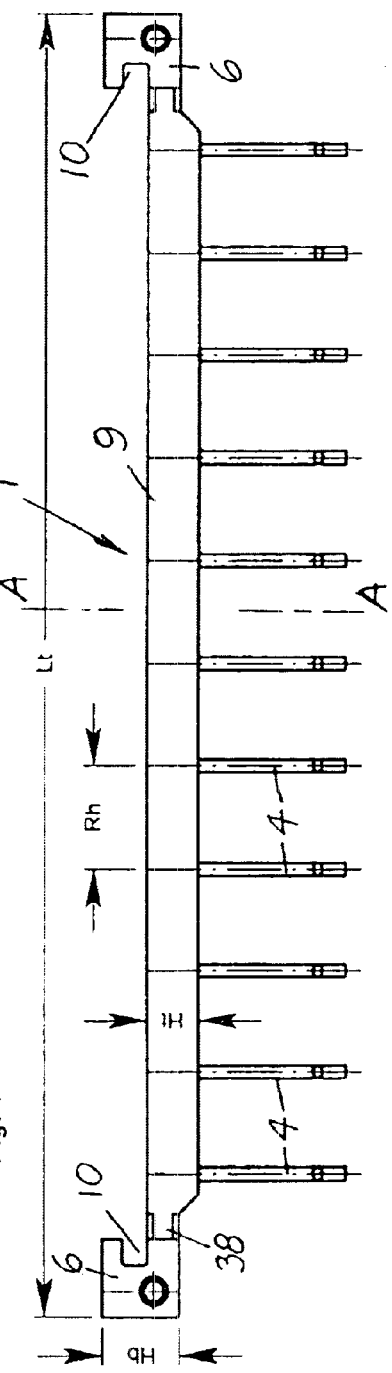
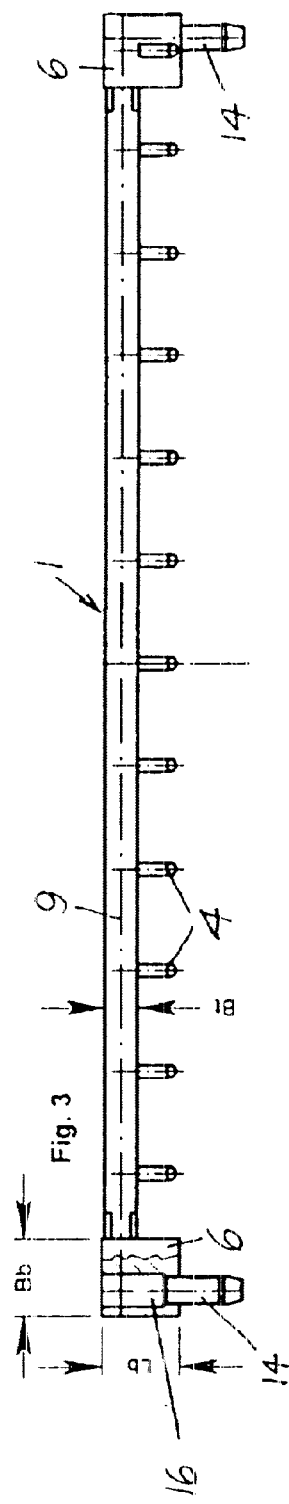
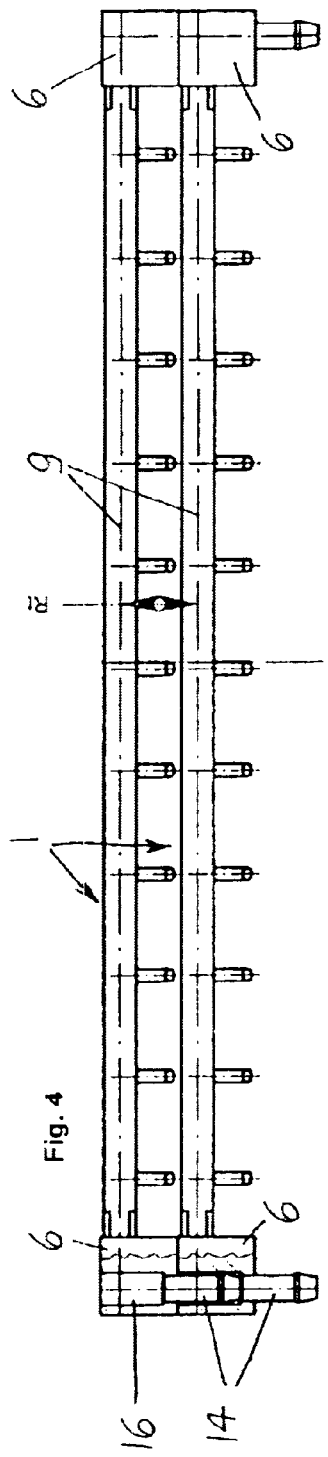
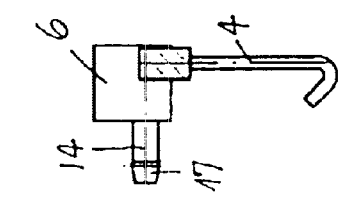

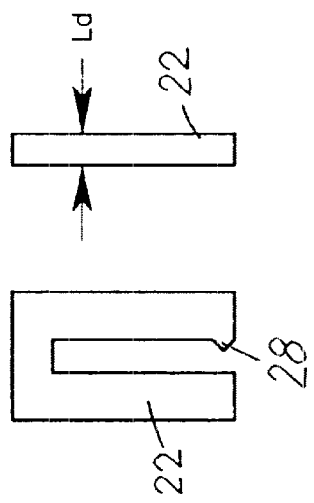
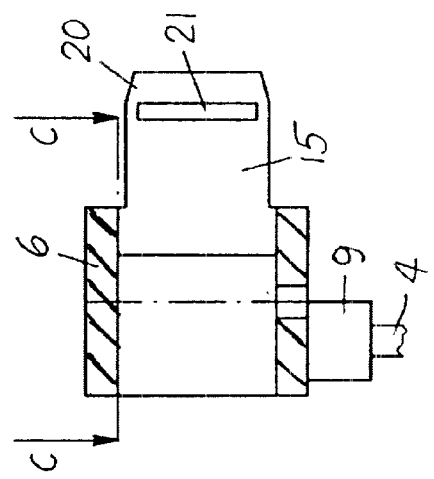
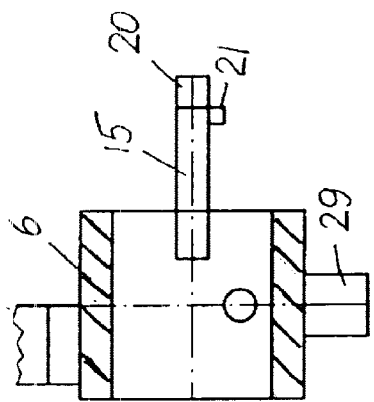
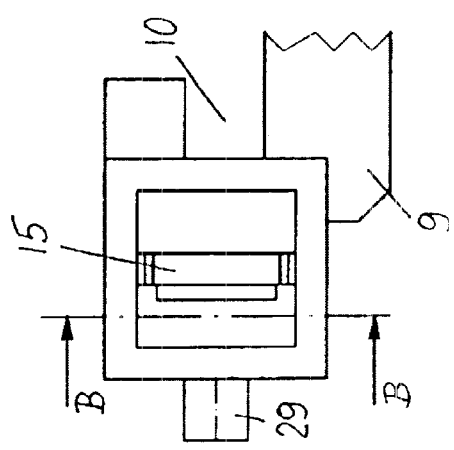

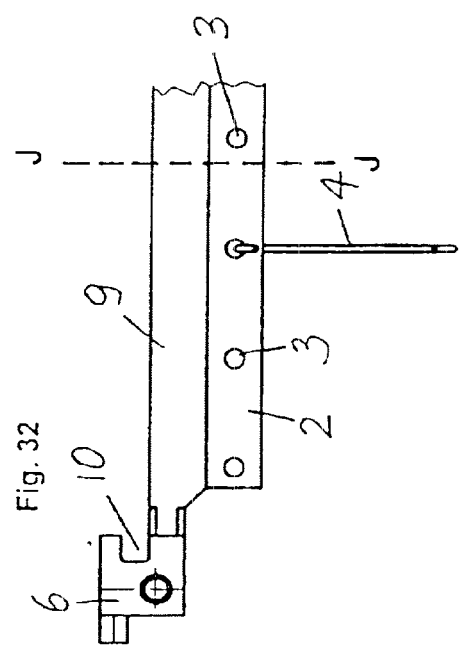
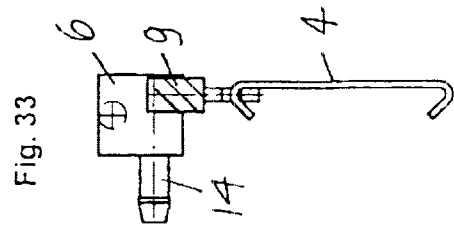
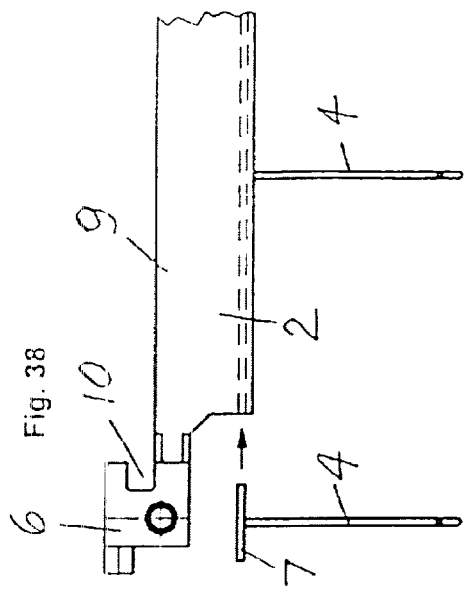
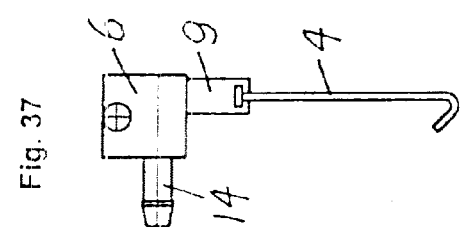
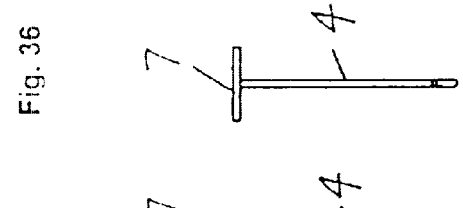
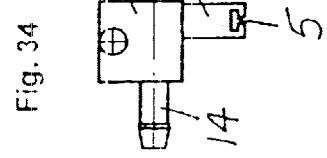

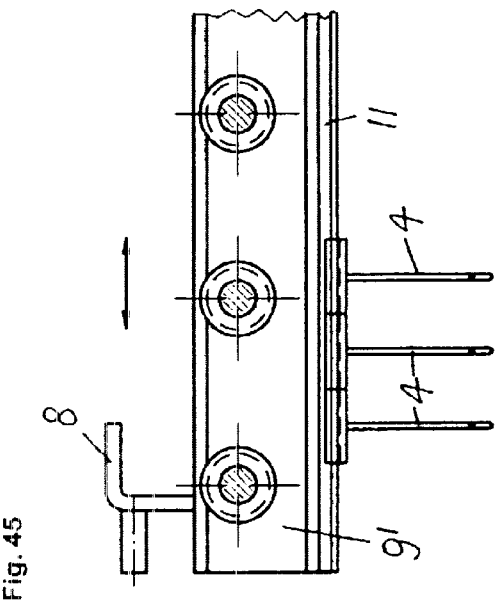

DEVICE FOR THE AUTOMATED HANDLING AND INTERIM BUFFERING OF MANUFACTURING COMPONENTS

BACKGROUND

1. Field of the Invention

The invention relates to a device for the automated handling and interim buffering of suspendable manufacturing components. Such manufacturing components are suspended from hooks on racks. The racks connect neighboring racks front to back forming a stable block of racks for transport.

2. The Prior Art

A carrier device for goods conveyed in a transporting or loading system is known that has a frame-like structure comprising at least two receiving points. The workpieces (or components) are suspended from the racks of the frame. A plurality of such carrier devices placed one against the other can be transported as a block. The carrier devices can then be separated at a later time.

The substantial drawback of the known device is that the workpieces are restricted with respect to their length and depth by the frame-like structure of the device. A further drawback is the fact that during the treatment process, the carrier device is immersed in the treating product together with the workpieces. The workpieces being treated can neither be tilted nor dragged because of the frame-like structure of the device. Furthermore, it is not possible to pick up an individual workpiece, which is essential when a workpiece needs to be moved. Finally, no torque exists so that the hooks may rotate themselves out of a suspended workpiece or receive such a workpiece.

SUMMARY OF THE INVENTION

The invention is a device of the type specified above designed so that the first loading of the component carrier system and the subsequent removal of components from that system can be carried out by hand or automatically, horizontally or vertically by simple means. The invention is further designed so that the conveyor system can be intermediately stored in a locked manner in serviceable high-rack warehouses or in mechanized feeding or unloading systems. The pallets may be any desired length, and are locked in position and secured against rotation in the course of loading and unloading operations.

The invention provides for a crossbeam comprising two oppositely arranged, inwardly directed bars for receiving the load of the device when the device is hung or picked up by grippers. These bars are located above the crossbeam. Elements for introducing a torque in the course of handling the components are arranged on the racks. The racks also have connecting surfaces on their front and back sides where the rack meets and is positioned flush against neighboring racks. The racks comprise hooks, clamps, fastening points or fastening rails located on their undersides and on secondary surfaces. Finally, the racks comprise support surfaces that support boxes or conveyor systems. The support surfaces are located laterally on the outside of the rack. They oppose each other and are directed downwards.

Side blocks are joined to the ends of the crossbeams and the inwardly directed bars are disposed above the side blocks. Shaft elements extend out from the outer surface of each side block allowing the crossbeam to rotate around its longitudinal axis when not joined to other racks. The side blocks further comprise joining elements, specifically pins and receiving holes that join neighboring racks. The pins have conical tips and a step where the cylinder shape of the pin ends and the conical tip begins.

The joining elements may also be fashioned as flat disk shaped elements. A safety bar is disposed at tip of the flat disk and a U-shaped spacer may be attached to the disk if greater space is needed between racks when they are joined.

The side blocks may be constructed from two L-shaped girders. When positioned rectangularly a stacker pocket is created within the side block. In order to join the racks with this side block construction a guiding means receiving channel is formed on the outer surface of the side block and allows for joining of the racks by means of ropes, chains, wires and rods. A side shaft with a collar also extends laterally outward from the side block.

The side block may have a Z-shaped cross section. The crossbeam is connected to the vertical leg of the side block. A lateral arm projects laterally outward from the upper horizontal leg and behind the rack. A vertical plug bolt projects downward from the arm. The plug bolt engages a sleeve of a neighboring rack. The sleeves are attached to the lower horizontal leg of the side block. The lateral arm may also be arranged on the vertical leg of the side block, in which case a shortened plug bolt and a shortened sleeve are used.

The side block may also have an L-shaped cross section. The crossbeam is secured on the vertical leg and a transverse pin is disposed between the horizontal leg and the crossbeam. An opening is formed between the legs, transverse pin and crossbeam and a safety shaft extends therethrough to join a series of racks.

The side block may also be a round tube. The crossbeam is secured on the bottom half of the tube and a flat element is attached to the top of the tube so that it extends laterally inward. This flat element acts as the inwardly directed bar. A safety shaft may also extend through a series of racks through the round tube.

Hooks are connected to the crossbeam to suspend the manufacturing components. The hooks may attach to the crossbeam through holes in a perforated raster, or a groove in the crossbeam.

Finally, the crossbeam may be designed in the form of an I-shaped girder. Inwardly directed bows are attached on top of each lateral end of the girder and outwardly projecting bolts are mounted on the bows to permit rotation of the girder.

BRIEF DESCRIPTION OF THE DRAWINGS

Other objects and features of the present invention will become apparent from the following detailed description considered in connection with the accompanying drawings, which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 1 shows a plane view of a first embodiment of the rack.

FIG. 2 shows a section according to line A—A in FIG. 1.

FIG. 3 is a plan view of FIG. 1

FIG. 4 is a plan view of two racks joined with each other for conveyance as a block of racks.

FIG. 5 shows an embodiment of the side block of the device.

FIG. 6 shows a section according to line B—B in FIG. 5.

FIG. 7 shows a section according to line C—C in FIG. 6.

FIGS. 8 and 9 show a front and a side view respectively, of a spacer disk.

FIG. 32 shows a crossbow with a side block.

FIG. 33 is a section according to line J—J in FIG. 32.

FIG. 34 is a side view of a block with an insertion rail linked to it.

FIGS. 35 and 36 show a hook element by a plan view and a side view, respectively.

FIGS. 37 and 38 show a crossbeam with an inserted groove keystone for the hooks according to FIGS. 35 and 36.

FIG. 39 shows a side view of a crossbeam in the form of an I-shaped girder.

FIG. 40 is a plan view of the embodiment according to FIG. 39.

FIG. 41 is a side view of the embodiment according to FIG. 39 joined for conveyance as a block.

FIGS. 42 and 43 show embodiments of the hooks for mounting on a crossbeam according to FIGS. 39 and 40; and FIGS. 44 and 45 show the embodiment according to FIGS. 39 and 40 operating on a roller transport system.

DESCRIPTION

Figure 10:
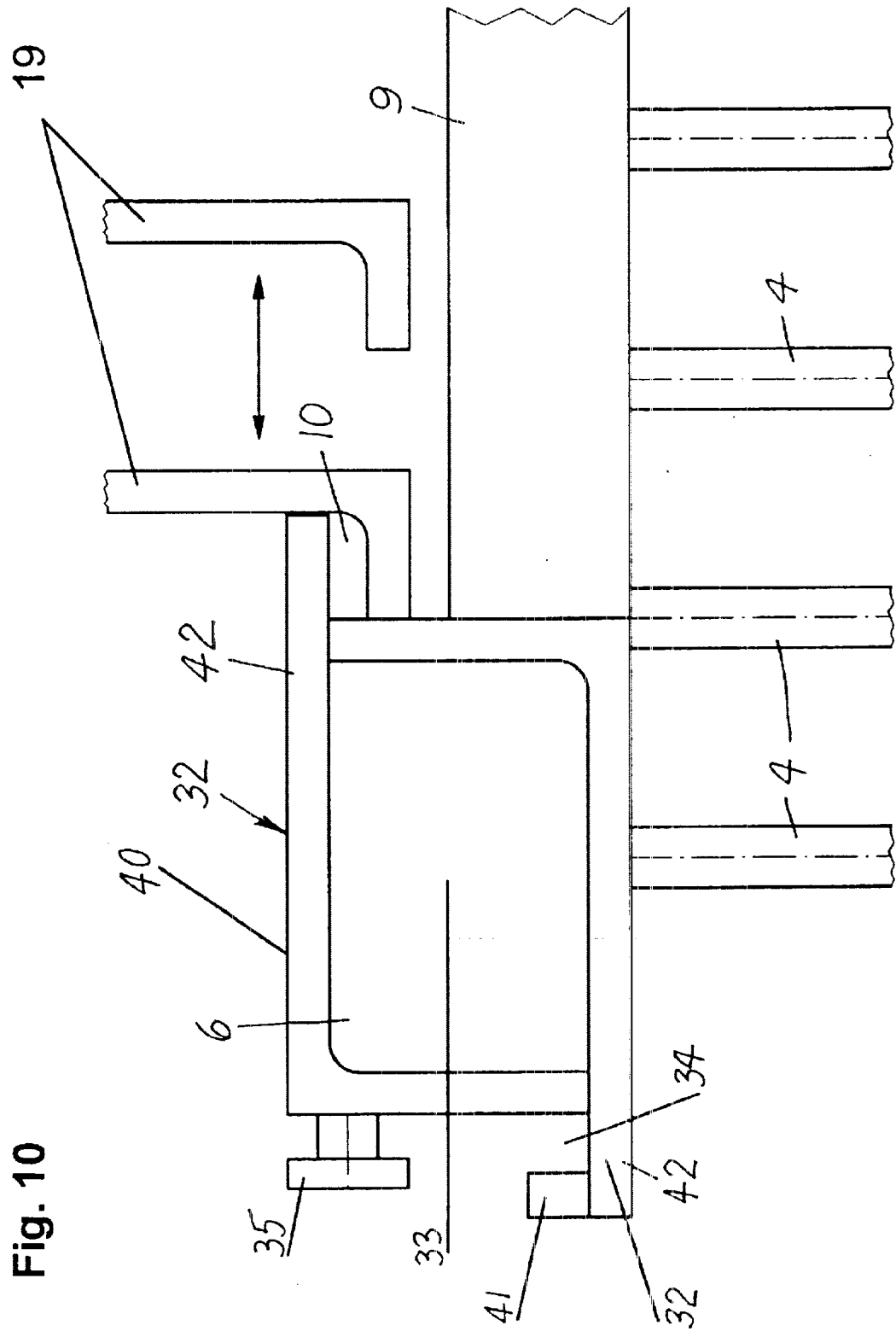
FIG. 10 shows a plan view of a second embodiment of the side block.

FIGS. 1 to 3 show a first embodiment for forming a rack 1 on which individual manufacturing components can be suspended in order to palletize crossbeams in such places as high-shelf warehouses. This is accomplished by engaging both sides of a crossbeam 9 with the inside of side blocks 6. This engagement by crossbeam 9 allows pallets to be safely received so that the pallet cannot turn itself out and detach itself. Rack 1 comprises two square stone-like side blocks 6, whereby crossbeam 9 is arranged on side blocks 6 by a shaft element 38 disposed on the inside of side blocks 6. Hooks 4 are attached to crossbeam 9 and spaced from each other. The manufacturing components are suspended from hooks 4. Crossbeam 9 may be designed in the form of a solid shaft or as a tube.

A total length "Lt" of crossbeam 9 preferably amounts to 800 mm or 1200 mm or 2400 mm. "Ht" denotes the height of crossbeam 9. Furthermore, "Bt" denotes the width of crossbeam 9, and "Bb" denotes the width and "Lb" the length of side block 6. "Hb" is the height of side block 6. "Rh" is the spacing between hooks 4.

Pins 14 are disposed on the front of side blocks 6 that are inserted into receiving holes 16 in order to join neighboring racks. Pins 14 are cylindrical and have conical tips 17 with a step 18 to lock pins 14 in place.

When two racks 1 are joined for conveyance as a block, as shown in FIG. 4, it results in a regular spacing of "Rt" between racks 1.

In the embodiment shown in FIGS. 5 to 7, side block 6 has a rectangular passage in which a narrow rectangular pin 15 is secured. Rectangular pin 15, which is made of flat iron, has a safety bar 21 on its tip 20. U-shaped spacer disks 22, having a clamping lug 28 on their openings, can be joined (FIGS. 8 and 9) in a self-clamping manner to rectangular pin 15. "Ld" denotes the length of spacer element 22. Shaft elements 29 are provided on the outside of side blocks 6 for rotating around the longitudinal axis of the traverse.

The embodiment of side block 6 shown in FIG. 10 is comprised of two L-shaped girders 32, whereby horizontal legs 42 of girders 32 project sideways. Top girder 32 laterally forms a receiving groove 10 beneath the end of its horizontal leg 42. Receiving groove 10 can be engaged by the tongues of an inside gripper 19. The interior of side block 6 forms a stacker pocket 33. A side shaft with a collar 35 is laterally mounted on the outside for swiveling the rack about crossbeam 9. Crossbeam 9 can also be designed in the form of a solid shaft or tube omitting the side shaft or side shafts with the collar 35. Furthermore, a side bar 41 is secured at the end of horizontal leg 42 of bottom girder 32, on the outside of rack 1. This creates a guiding means receiving channel 34 and a side support on which tensioning elements such as ropes, chains, wires and rods for rigging the first and the last crossbeams can be inserted. Top surface 40 of side block 6 can be designed as a customer-specific surface such as a surface for installing drilled holes, threads, eyes, pockets or the like.

Crossbeams 9, conveyed as a connected block, can be secured in the gripper by inserting separate empty racks at the beginning and end of the rack block. Such empty racks provide for a widened horizontal leg 42 and are preferably engaged with gripper 19 in an interlocking manner. The effect of the interlocking manner can be improved by means of teeth located in the interlocking areas.

Figure 11:
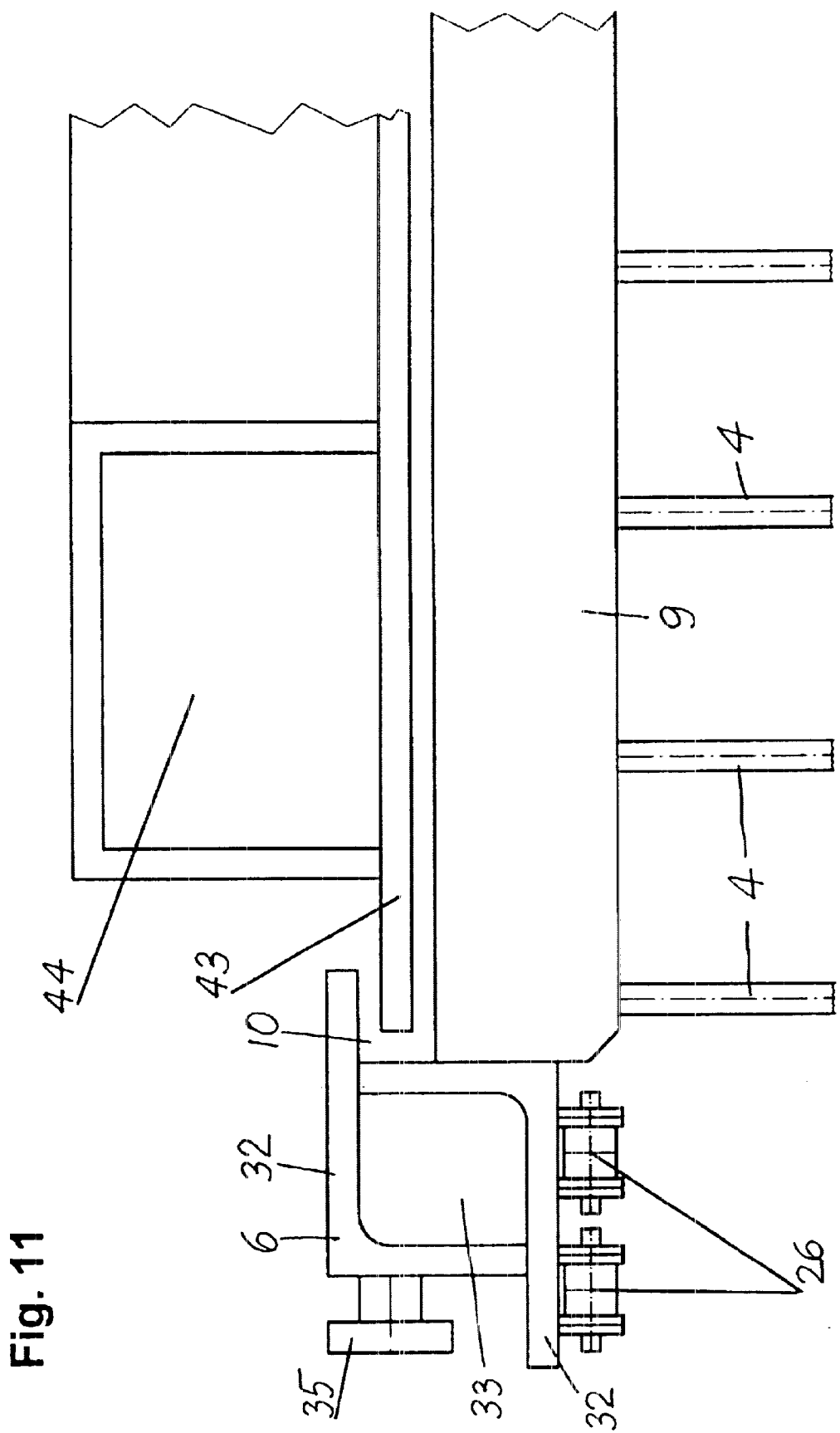
FIG. 11 is a plan view of the side block according to FIG. 10 with an adapter plate for a stacker.
Figure 15:
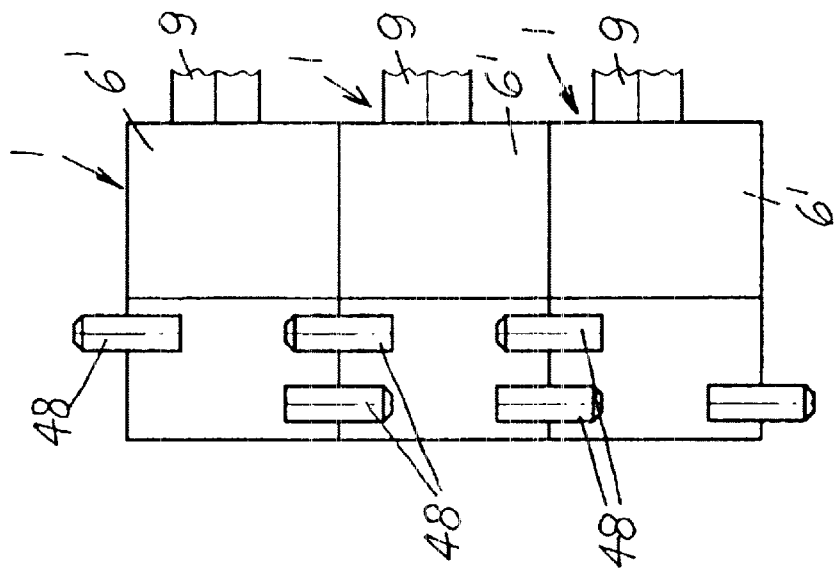
FIG. 15 is a plan view of the device with side blocks according to FIG. 12 joined for conveyance as a block.
Figure 12:
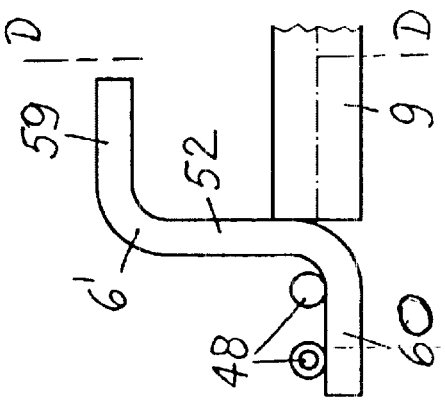
FIG. 12 is a partial view of the device with a third embodiment of the side block.
Figure 13:
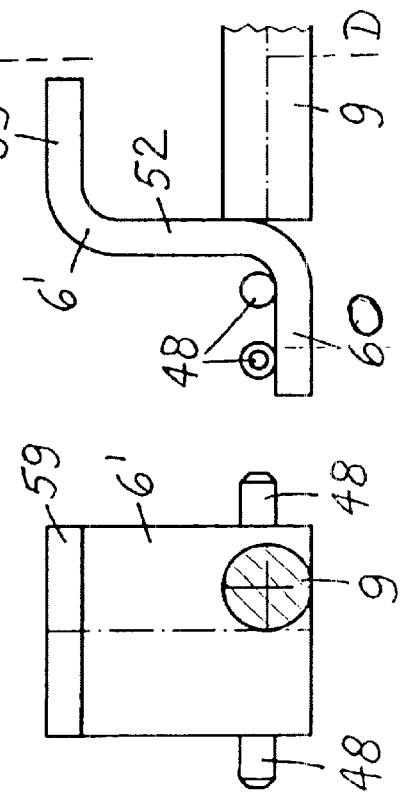
FIG. 13 shows a section according to line D—D in FIG. 12.
Figure 14:
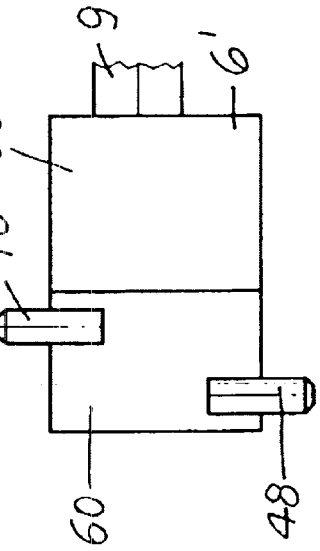
FIG. 14 is a plan view of FIG. 12.

The embodiment according to FIG. 11 shows crossbeam 9 received with an adapter plate 43 for a stacker with a stacker pocket 44. Adapter plate 43 can be frontally driven into receiving groove 10 of crossbeams 9. However, the use of an inside gripper actuated hydraulically would be advantageous. It further shows conveyor chain support surfaces 26 on the bottom surface of side blocks 6.

The embodiment of the device shown in FIGS. 12 to 15 comprises a side block with a Z-shaped cross section on both sides of crossbeam 9. Z-shaped structure consists of a vertical leg 52, an upper horizontal leg 59 directed inwards, and a lower horizontal leg 60 directed outwards. Crossbeam 9 is secured on vertical leg 52. Furthermore, pins 48 are arranged on horizontal leg 60 in an offset manner, whereby pins 48 absorb the torque in the condition of conveyance as a connected block of joined racks (FIG. 42). The rigging for conveyance is accomplished with the help of a separate element that keeps the individual racks 1 together in a suitable manner. This can be accomplished with the help of rods, wires, chains, cables and the like.

In another embodiment shown in FIGS. 16 to 19, side block 6" is L-shaped and comprises a downwardly directed vertical leg 55 and an upper, inwardly directed horizontal leg 56. Crossbeam 9 is secured at the bottom of the vertical leg 55 and a transverse pin 47 is arranged parallel to vertical leg 55 and extends between horizontal leg 56 and crossbeam 9.

Figure 19:
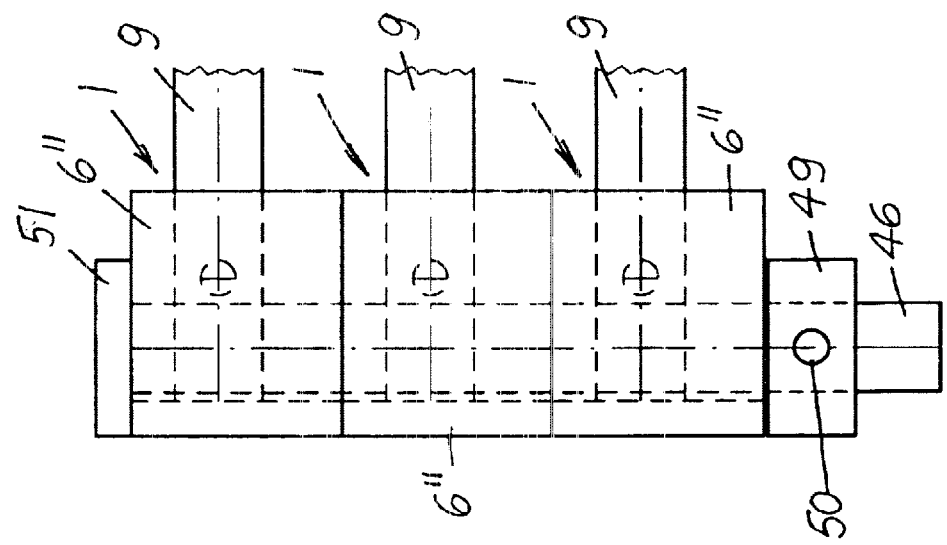
FIG. 19 is a plan view of the side blocks according to FIG. 16 joined for conveyed as a block.
Figure 16:
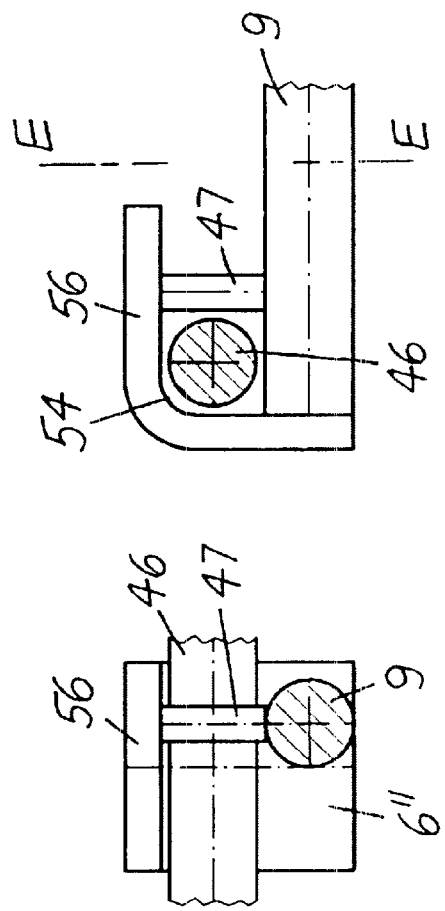
FIG. 16 is a partial view of the device with a fourth embodiment of the side block.
Figure 18:
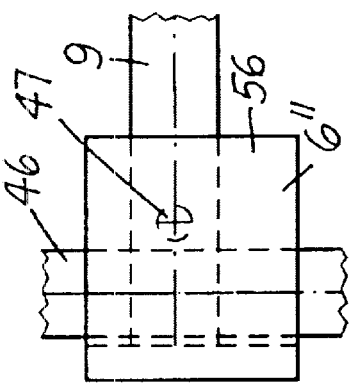
FIG. 18 is a plan view of FIG. 16.
Figure 17:
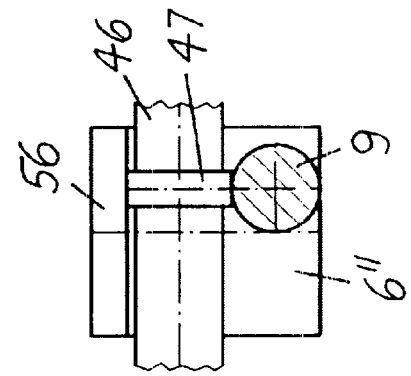
FIG. 17 shows a section according to line E—E in FIG. 16.

A safety shaft 46 can be plugged through an opening 54 formed by crossbeam 9, transverse pin 47, vertical leg 55, and horizontal leg 56. Safety shaft 46 is plugged in the direction of conveyance 53 for racks 1, which are resting against one another as a block for conveyance (FIG. 19). Safety shaft 46 comprises a head 51 and an end disk 49 with a safety pin 50 for securing it. Safety shaft 46 absorbs the torque in that it serves as a support for the torque, as a rigging element, and secures individual racks 1 against unintentional detachment.

Figure 20:
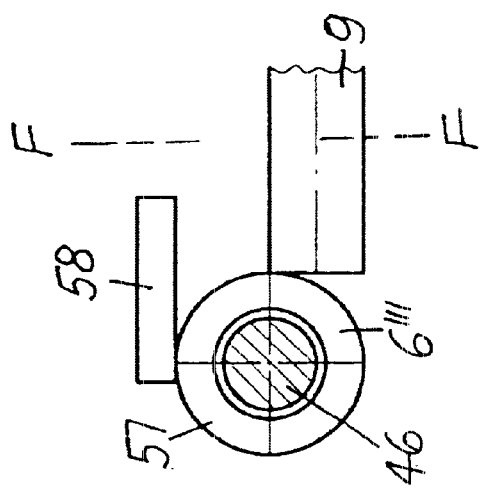
FIG. 20 is a partial view of the device with a fifth embodiment of the side block.
Figure 22:
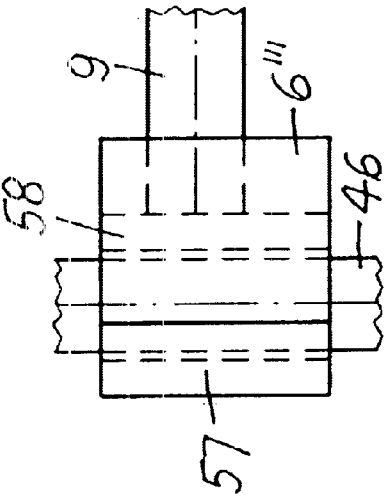
FIG. 22 is a plan view of FIG. 20.
Figure 21:
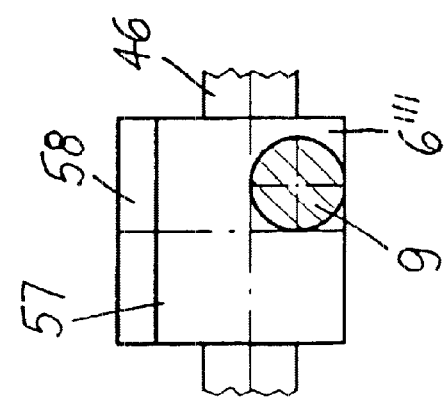
FIG. 21 shows a section according to line F—F in FIG. 20.
Figure 27:
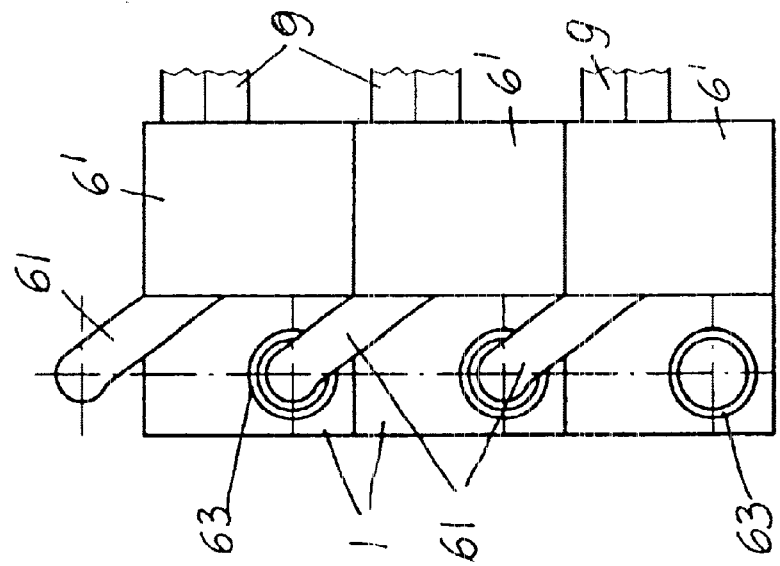
FIG. 27 is a plan view of the side blocks according to FIG. 24 joined for conveyance as a block.
Figure 24:
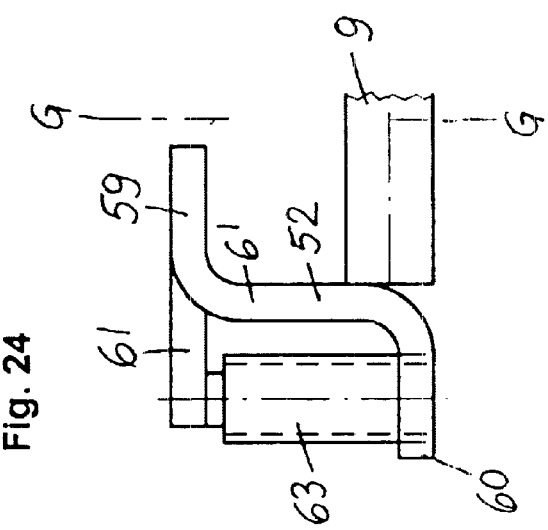
FIG. 24 is a partial view of the device with a sixth embodiment of the side block.
Figure 26:
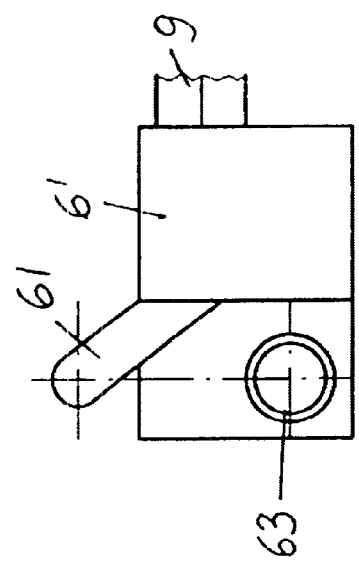
FIG. 26 is a plan view of FIG. 24.
Figure 25:
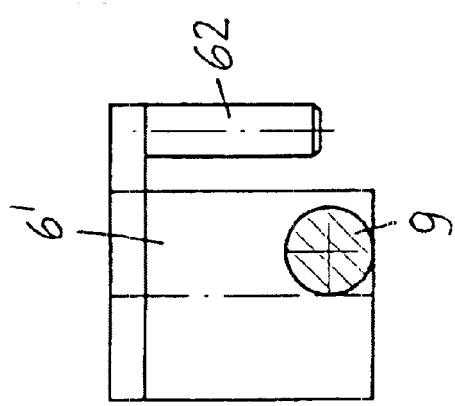
FIG. 25 is a section according to line G—G in FIG. 24.

FIGS. 20 to 22 show another variation of side block 6 on rack 1, whereby side block 6'" comprises a round tube 57 on top of which a horizontally extending flat element 58 is welded. Flat elements 58 bear the load of the rack when grippers are used. Crossbeam 9 is secured on an outer surface of round tube 57. Safety shaft 46 extends through the bore of round tube 57. Round tube 57 may be provided with drilled drain holes for draining acid. Furthermore, flat element 58 may be omitted if an external gripper is employed for the pick-up.

Figure 23:
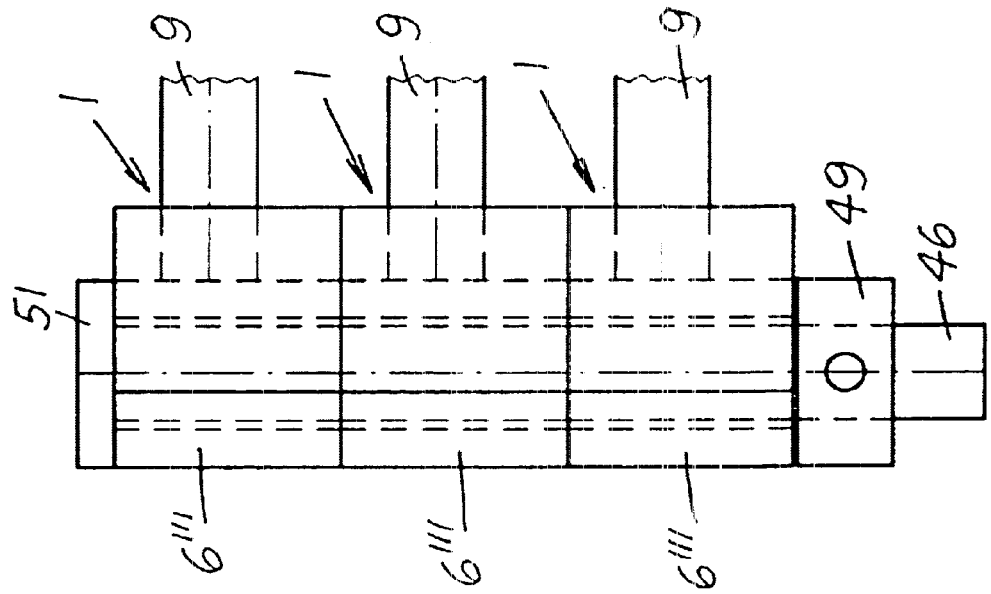
FIG. 23 is a plan view of the side blocks according to FIG. 20 joined for conveyance as a block.

FIG. 23 shows side blocks 6'" joined as a block of racks for conveyance, whereby a screwed joint may be used for modifying safety shaft 46.

In the embodiments shown in FIGS. 24 to 31, longitudinal locking, transverse locking and absorption of torque is simultaneously made possible by vertical plugging, so that no later securing of the crossbeams is required.

The embodiment of the device shown in FIGS. 24 through 27 comprises a side block 6' with a Z-shaped cross section. The Z-shaped structure is comprised of a vertical leg 52, an upper inwardly directed horizontal leg 59, and an outwardly directed, lower horizontal leg 60. Crossbeam 9 is secured on the inside of vertical leg 52.

Upper horizontal leg 59 is adjoined to an arm 61 which is directed laterally away from side block 6', whereby a vertical plug bolt 62 is mounted on its end. A vertically aligned sleeve 63 is arranged on lower horizontal leg 60 of side block 6'.

With racks 1 conveyed as a block (FIG. 27), plug bolt 62 of one rack is plugged into the corresponding sleeve 63 of a trailing rack 1, so that individual crossbeams 9 are locked with each other by vertical plugging.

Figure 31:
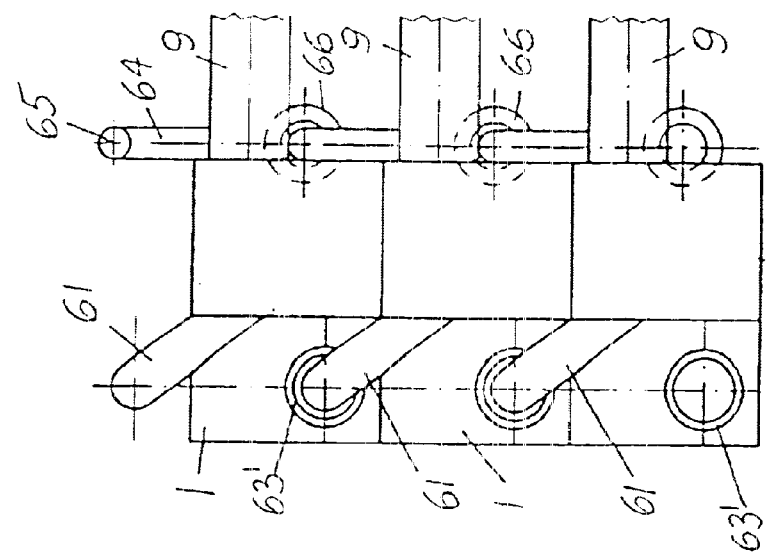
FIG. 31 is a plan view of the side blocks according to FIG. 28 joined for conveyance as a block.
Figure 28:
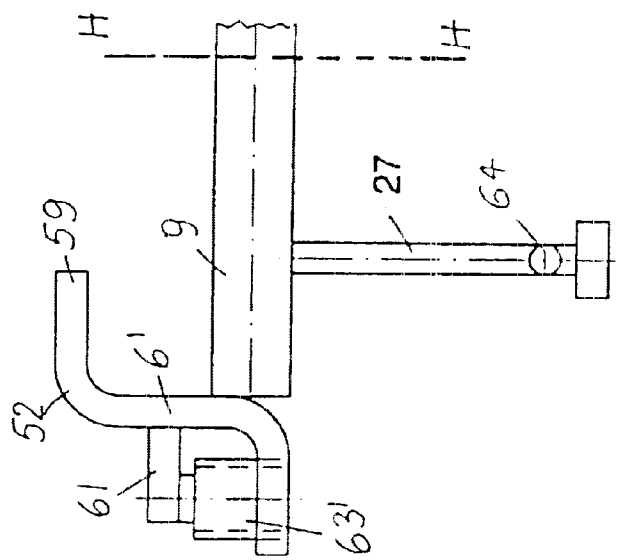
FIG. 28 is a partial view of the device with a seventh embodiment of the side block.
Figure 29:
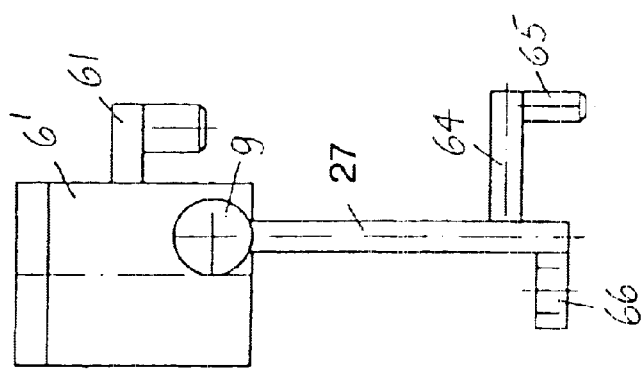
FIG. 29 is a section according to line H—H in FIG. 28.
Figure 30:
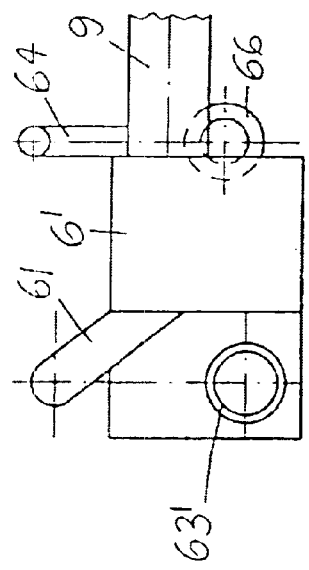
FIG. 30 is a plan view of FIG. 28.

In another embodiment according to FIGS. 28 through 31, an additional plug bolt 65, arranged on an arm 64, is located near the lower end of a side strut 27. A perforated disk 66 is arranged laterally on side strut 27 and the conveyance of racks 1 as a block engages the perforated disk 66 of a trailing or leading rack (FIG. 31).

Arm 61' is mounted on vertical leg 52 of side block 6' and vertical plug bolt 62' is shortened. A correspondingly shortened sleeve 63' is mounted on lower horizontal leg 60 of side block 6'. In said embodiment, locking takes place both in the area of the side blocks 6' and the area of the ends of the hooks.

In the embodiment shown in FIGS. 32 and 33, a suspension bar 2 is mounted on the underside of crossbeam 9. Provision is made for holes or eyes 3 in suspension bar 2. Hooks 4 can be suspended free of locking in a hole or eye 3. Such an embodiment can be used for suspending wire hooks, whereby the manufacturing components can be tied to or directly suspended in the hooks. It is also possible to use holes 3 shaped in other forms, for example in the form of a keyhole for a lock, or to employ other fastening and clamping mechanisms. The fastening can be accomplished in a smooth or rigid rotational manner.

In the embodiment shown in FIGS. 34 to 38, provision is made on the underside of crossbeam 9 for a T-shaped groove 5 into which hook 4, shaped on its upper end in the form of a groove stone 7, can be pushed, as particularly shown in FIG. 38.

The embodiment shown in FIGS. 39 to 45 shows a crossbeam 9' that is designed in the form of an I-shaped traverse comprising an inside receiving element 8 located on the top-side of crossbeam 9'. A shaft element 10 is located laterally of inside receiving element 8. A T-shaped rail 11, onto which the correspondingly shaped hooks 4 (FIGS. 42 and 43) can be pushed, is located on the bottom side of crossbeam 9'. Hooks 4 are provided for that purpose with corresponding receiving element 12.

FIG. 41 shows two crossbeams 9', which are conveyed resting flatly against each other. Crossbeams 9' can be secured for their transport, for example by means of a clamping device. Crossbeams 9' in the form of I-shaped transverse girders can be transported on a roller transport system as the one shown in FIGS. 44 and 45.

Accordingly, while at least one embodiment of the present invention has been shown and described, it is to be understood that many changes and modifications may be made thereunto without departing from the spirit and scope of the invention as defined in the appended claims.

What is claimed is:

1. A device for the automated handling, interim buffering, and conveying of suspendable manufacturing components in a conveying direction, whereby the components are suspended from successively arranged racks, each rack comprising:

a crossbeam for supporting the suspendable manufacturing components;

two oppositely arranged, inwardly directed bars disposed above and at lateral ends of said crossbeam, wherein groves are formed beneath said inwardly directed bars so that said inwardly directed bars may support the load of the rack;

joining elements disposed at the lateral ends of the crossbeam, wherein said joining elements join multiple racks together and introduce a torque to resist rotation of the rack during transport;

at least one contact surface on the front and back side of the rack, wherein said at least one contact surface meets at least one neighboring rack surface when successive racks ar joined in series;

fastening devices disposed on an underside of the rack wherein said fastening devices hold the suspended components; and at least one support surface disposed at the lateral ends on top of the rack;

wherein the rack is lifted and supported by said inwardly directed bars when multiple racks are joined in series by said joining elements for transport.

2. The device according to claim 1, further comprising side blocks having an inner, outer, top and bottom surfaces, and connected to the lateral ends of said crossbeam wherein said inwardly directed bars are disposed on top of said side blocks, said side blocks comprise a receiving groove for receiving grippers, and said receiving groove is disposed beneath said inwardly directed bar and on said inner surface of said side blocks.

3. The device according to claim 2, wherein said side blocks further comprise shaft elements disposed on said outer surface of said side blocks, wherein said shaft elements allow for rotation of the crossbeam around its longitudinal axis.

4. The device according to claim 2, wherein said side blocks comprise said joining elements that comprise pins and drilled receiving holes for joining neighboring racks.

5. The device according to claim 4, wherein said pins are cylindrical and have a conical tip with a step separating said conical tip from a remainder of said pin.

6. The device according to claim 4, wherein said pins are disk-shaped and comprise a safety bar on a tip.

7. The device according to claim 6, wherein a U-shaped spacer disk can be joined to said pin for spacing purposes when the racks are joined.

8. The device according to claim 2, further comprising conveyor chain support surfaces on said bottom surface of said side blocks.

9. The device according to claim 1, wherein the total length of said crossbeam amounts to 800 mm, 1200 mm or 2400 mm.

10. The device according to claim 2, wherein two L-shaped girders form said side block and said two L-shaped girders are positioned so that said side block is rectangular and a stacker pocket is created inside said side block.

11. The device according to claim 10, wherein said side block further comprises a guiding means receiving channel for joining multiple racks, and a side shaft with a collar for allowing rotation of the rack, both of which are disposed on said outer surface of said side block.

12. The device according to claim 2, wherein said side block is an open type of construction without cavities and when conveyed as a block of racks, the racks are joined via said joining elements.

13. The device according to claim 12, wherein said side block has a Z-shaped cross-section in relation to the direction of transport, and comprises an upper horizontal leg, a lower horizontal leg, and a vertical leg, and said crossbeam is mounted on said vertical leg of said side block.

14. The device according to claim 12, wherein said side block is L-shaped comprising a vertical leg and a horizontal leg, said crossbeam is secured on said vertical leg, and a transverse pin is disposed between said horizontal leg and said crossbeam.

15. The device according to claim 14, wherein a said joining element is a safety shaft that extends through a series of racks in the direction of transport through an opening formed by said vertical and horizontal legs of said side block, said transverse pin and said crossbeam.

16. The device according to claim 2, wherein said side block is a round tube extending in said direction of transport wherein a horizontally inward extending flat element is secured on top of said round tube and said crossbeam is secured on a bottom half of said round tube.

17. The device according to claim 16, wherein said joining element is a safety shaft that extends through a series of racks inside of said round tube.

18. The device according to claim 13, wherein said joining element comprises a lateral arm that projects laterally outward and behind said upper horizontal leg of said side block, wherein said arm comprises a vertical plug bolt that engages a sleeve of a neighboring rack, and said sleeve is secured on said lower horizontal leg of said side block.

19. The device according to claim 18, wherein said lateral arm is arranged on said vertical leg of said side block and comprises a shortened plug bolt that engages a shortened sleeve.

20. The device according to claim 1, wherein said fastening devices are hooks that can be freely suspended from said crossbeam in holes in a perforated extension of said crossbeam.

21. The device according to claim 1, wherein said fastening devices are hooks comprising a groove keystone so said fastening devices can be laterally pushed into a groove in said crossbeam.

22. The device according to claim 1, wherein said crossbeam is designed in the form of an I-shaped girder, comprising inwardly directed bows disposed on top of each lateral end of said girder for receiving a load, and further comprising outwardly directed bolts mounted on said bows permitting rotation of said girder.

* * * * *